United States Patent
Ariga et al.

(10) Patent No.: US 12,504,966 B2
(45) Date of Patent: Dec. 23, 2025

(54) CENTER, CONTROL METHOD, AND NON-TRANSITORY STORAGE MEDIUM

(71) Applicant: TOYOTA JIDOSHA KABUSHIKI KAISHA, Toyota (JP)

(72) Inventors: Takanori Ariga, Toyota (JP); Yusuke Satoh, Nisshin (JP); Satoru Fukuyo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 18/322,900

(22) Filed: May 24, 2023

(65) Prior Publication Data

US 2023/0385050 A1    Nov. 30, 2023

(30) Foreign Application Priority Data

May 31, 2022    (JP) .................................. 2022-088654

(51) Int. Cl.
*G06F 8/65* (2018.01)

(52) U.S. Cl.
CPC ..................... *G06F 8/65* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 7,286,502 | B1 * | 10/2007 | Rao | G06F 3/023 |
| | | | | 370/328 |
| 11,169,793 | B2 * | 11/2021 | Miyake | G06F 21/57 |
| 2020/0183676 | A1 * | 6/2020 | Sakurai | H04L 67/34 |

FOREIGN PATENT DOCUMENTS

| | | | | |
|---|---|---|---|---|
| CN | 114003242 A | * | 2/2022 | ............ G06F 8/61 |
| JP | 2004-185114 A | | 7/2004 | |
| JP | 2004-326689 A | | 11/2004 | |
| JP | 2005-321876 A | | 11/2005 | |
| JP | 2008-234553 A | | 10/2008 | |

(Continued)

OTHER PUBLICATIONS

Software Updating Device, Updating Control Method, Non-temporary Storage Medium and Server (Year: 2022).*

(Continued)

*Primary Examiner* — Ziaul A Chowdhury
(74) *Attorney, Agent, or Firm* — Oblon, McClelland, Maier & Neustadt, L.L.P.

(57) ABSTRACT

A center that is configured to communicate with an Over-The-Air (OTA) master that controls software update for an electronic control unit mounted on a vehicle is provided. The center includes one or more processors configured to determine availability of permission frames when an inquiry for software update is received from the OTA master and update data for the electronic control unit exists, and, when at least one of the permission frames is available, allocate the permission frame available among the permission frames to the OTA master and permit update processing. The one or more processors are configured to determine availability of a multiplex frame when a transmission request for the distribution package is received from the OTA master, and, when at least one of the multiplex frames is available, allocate a multiplex frame available among the multiplex frames to the OTA master and control transmission of the distribution package.

9 Claims, 7 Drawing Sheets

(56) References Cited

FOREIGN PATENT DOCUMENTS

| | | | |
|---|---|---|---|
| JP | 2018-132979 A | 8/2018 | |
| JP | 2020-42568 A | 3/2020 | |
| JP | 2022124732 A * | 8/2022 | ............ H04W 8/245 |

OTHER PUBLICATIONS

Center, Update Management Method and Update Management Program (Year: 2021).*

* cited by examiner

<PERMISSION FRAME (TICKET FRAME) INFORMATION>

| FRAME NUMBER | STATE | VEHICLE ID |
|---|---|---|
| T01 | USED | 111222333 |
| T02 | USED | 444555666 |
| T03 | AVAILABLE | --- |
| ... | ... | ... |

FIG. 4B

<MULTIPLEX FRAME (SLOT FRAME) INFORMATION>

| FRAME NUMBER | STATE | VEHICLE ID |
|---|---|---|
| S01 | USED | 444555666 |
| S02 | AVAILABLE | --- |
| S03 | USED | 111222333 |
| ... | ... | ... |

CENTER, CONTROL METHOD, AND NON-TRANSITORY STORAGE MEDIUM

CROSS-REFERENCE TO RELATED APPLICATION

This application claims priority to Japanese Patent Application No. 2022-088654 filed on May 31, 2022, incorporated herein by reference in its entirety.

BACKGROUND

1. Technical Field

The present disclosure relates to a center, a control method, and a non-transitory storage medium.

2. Description of Related Art

A vehicle is equipped with a plurality of electronic control units for controlling an operation of the vehicle. The electronic control unit includes a processor, a transitory storage unit such as RAM, and a non-volatile memory, which is a non-volatile storage unit such as flash ROM. The electronic control unit realizes a control function of the electronic control unit through the processor executing software stored in the non-volatile memory. The software stored in each electronic control unit is rewritable, and by updating to a newer version of the software, it is possible to improve the functions of each electronic control unit and add new vehicle control functions.

Over-The-Air (OTA) technology that updates or adds software to the electronic control unit by wirelessly connecting an in-vehicle communication device that is connected to an in-vehicle network to a communication network such as the Internet, causes a device responsible for updating processing of the software of the vehicle to download the software from a server via wireless communication, and installs the downloaded software onto the electronic control unit is known as a technology for updating software of the electronic control unit. For example, see Japanese Unexamined Patent Application Publication No. 2004-326689.

SUMMARY

When OTA services are provided, there is a demand that pressure should not be put on a communication band and other services provided to the vehicle should not be affected. For this reason, the communication band that can be used for the OTA services is limited. Further, when software is updated, there is also a demand to complete all updates of a target electronic control unit within a predetermined period. In order to satisfy these two demands, it is necessary to efficiently use the limited communication band and provide OTA services such as software update.

The present disclosure provides a center or the like that can execute software update by efficiently transmitting a distribution package without putting pressure on a communication band.

A center according to a first aspect of the present disclosure is configured to communicate with an OTA master that controls software update for an electronic control unit mounted on a vehicle. The center includes one or more processors configured to: determine availability of permission frames that define the number of permissions for update processing when an inquiry for software update is received from the OTA master and update data for the electronic control unit exists; and, when at least one of the permission frames is available, allocate a permission frame available among the permission frames to the OTA master that transmits the inquiry and permit update processing. The one or more processors are configured to: determine availability of multiplex frames that define the number of permissions for parallel transmission of a distribution package when a transmission request for the distribution package is received from the OTA master to which the permission frame is allocated; and, when at least one of the multiplex frames is available, allocate a multiplex frame available among the multiplex frames to the OTA master to which the permission frame is allocated and control transmission of the distribution package.

A second aspect of the present disclosure relates to a control method executed by a center that includes one or more processors and one or more memories and is configured to communicate with an OTA master configured to control software update for an electronic control unit mounted on a vehicle. The control method includes determining availability of permission frames that define the number of permissions for update processing when an inquiry for software update is received from the OTA master and update data for the electronic control unit exists, allocating a permission frame available among the permission frames to the OTA master that transmits the inquiry and permitting update processing when at least one of the permission frames is available, determining availability of multiplex frames that define the number of permissions for parallel transmission of a distribution package when a transmission request for the distribution package is received from the OTA master to which the permission frame is allocated, and allocating a multiplex frame available among the multiplex frames to the OTA master to which the permission frame is allocated and controlling transmission of the distribution package when at least one of the multiplex frames is available.

A third aspect of the present disclosure relates to a non-transitory storage medium that stores a control program that is executable by a computer of a center that includes one or more processors and one or more memories and is configured to communicate with an OTA master configured to control software update for an electronic control unit mounted on a vehicle and causes the computer to perform functions. The functions include determining availability of permission frames that define the number of permissions for update processing when an inquiry for software update is received from the OTA master and update data for the electronic control unit exists, allocating a permission frame available among the permission frames to the OTA master that transmits the inquiry and permitting update processing when at least one of the permission frames is available, determining availability of multiplex frames that define the number of permissions for parallel transmission of a distribution package when a transmission request for the distribution package is received from the OTA master to which the permission frame is allocated, and allocating a multiplex frame available among the multiplex frames to the OTA master to which the permission frame is allocated and controlling transmission of the distribution package when at least one of the multiplex frames is available.

With each aspect of the present disclosure, software update can be performed by efficient transmission of distribution packages without putting pressure on the communication band.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A center of the present disclosure uses permission frames to control the number of OTA masters that can update software, and multiplex frames to control the number of distribution packages that can be transmitted simultaneously. With this processing, software update can be executed by efficiently transmitting a distribution package without putting pressure on a communication band.

An embodiment of the present disclosure will be described in detail below with reference to the drawings.

Embodiment

Configuration

Figure 1:
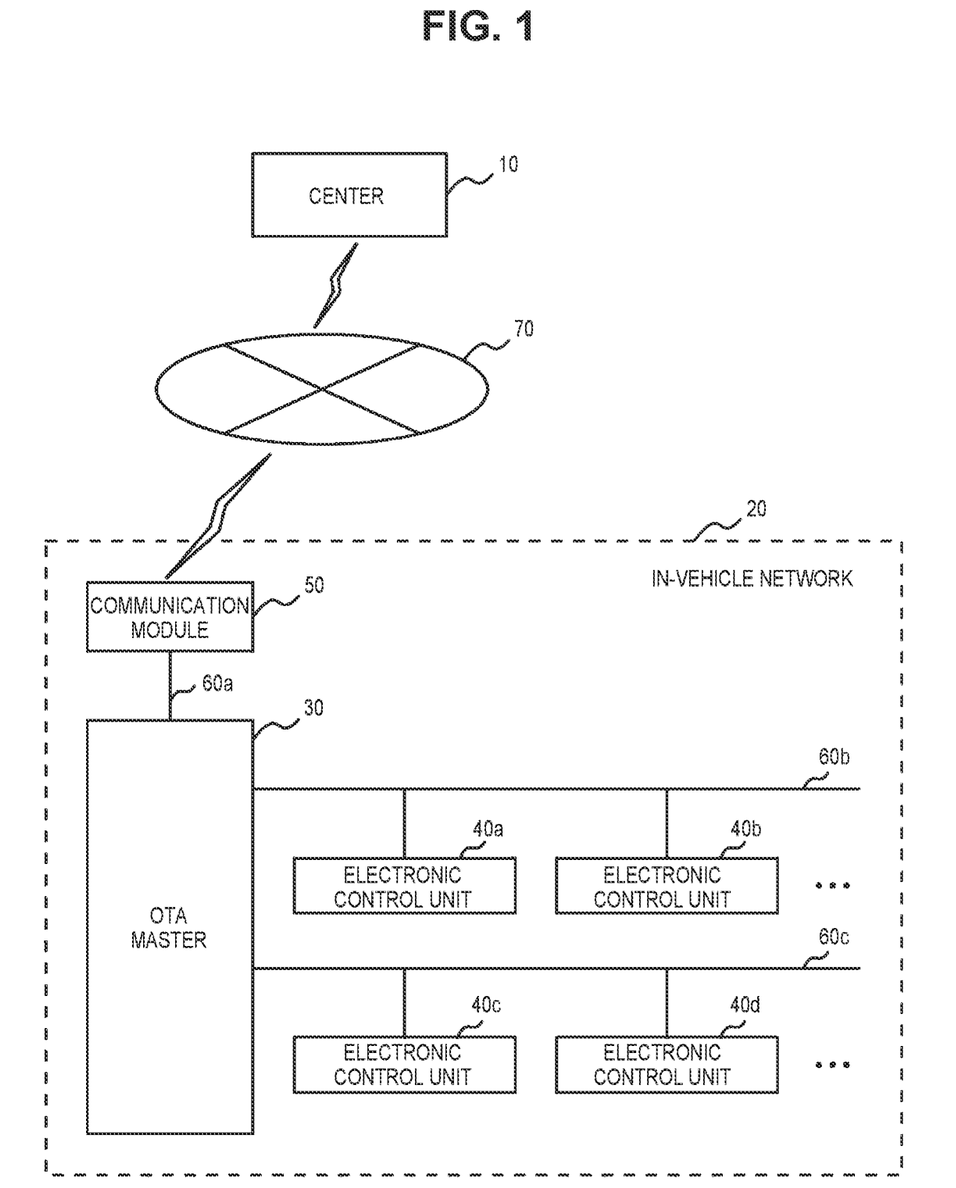
FIG. 1 is a block diagram illustrating an overall configuration of a network system according to a present embodiment.

FIG. 1 is a block diagram illustrating an overall configuration of a network system according to the embodiment of the present disclosure. The network system illustrated in FIG. 1 is a system for updating software of a plurality of electronic control units 40a to 40d mounted on a vehicle. The network system includes a center 10 located outside the vehicle and an in-vehicle network 20 constructed inside the vehicle.

(1) Center

The center 10 can communicate via a network 70 with an OTA master 30 provided in the in-vehicle network 20 and described below. The center 10 can control and manage software updates for the electronic control units 40a to 40d connected to the OTA master 30 by transmitting update data for the software of the electronic control units 40a to 40d and receiving notifications indicating the progress status of software update processing to and from the OTA master 30. The center 10 functions as a so-called server.

Figure 2:
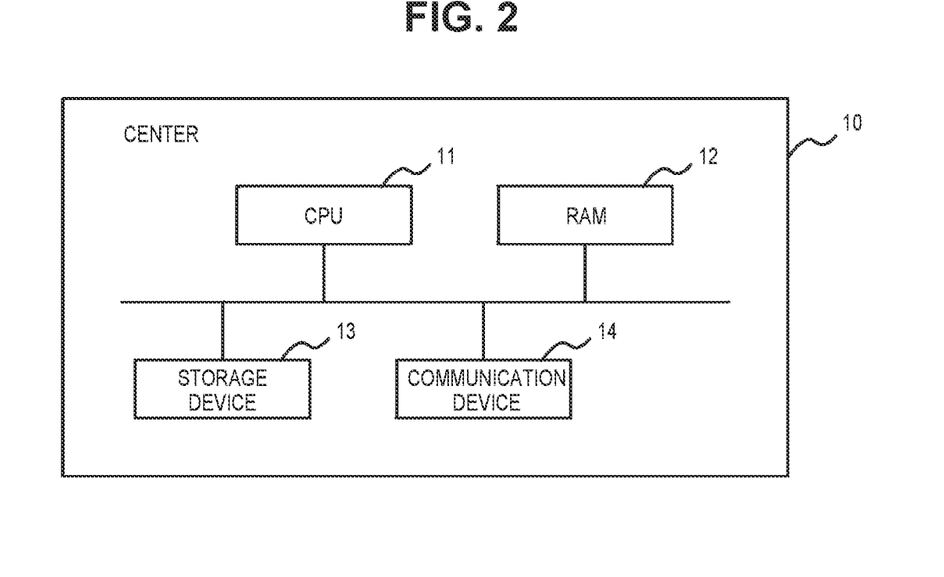
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a random access memory (RAM) 12, a storage device 13, and a communication device 14. The storage device 13 is a device including a readable and writable storage medium such as a hard disk drive (HDD) or a solid state drive (SSD). The storage device 13 stores a program for executing software update management, information used for software update control and update management, update data for software of each electronic control unit, and the like. The number of the CPUs 11, RAMs 12, and the storage devices 13 may be respectively plural. In the center 10, one or more CPUs 11 execute predetermined processing related to software update by executing programs read from one or more storage devices 13 using one or more RAMs 12 as work areas. The communication device 14 is a device for communicating with the OTA master 30 via the network 70.

Figure 3:
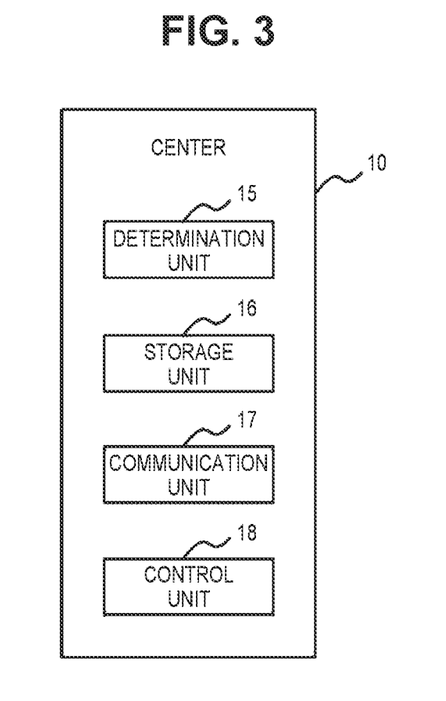
FIG. 3 is a functional block diagram of the center.

FIG. 3 is a functional block diagram of the center 10 illustrated in FIG. 2. The center 10 illustrated in FIG. 3 includes a determination unit 15, a storage unit 16, a communication unit 17, and a control unit 18. The storage unit 16 is realized by the storage device 13 illustrated in FIG. 2. The determination unit 15, the communication unit 17, and the control unit 18 are realized by one or more CPUs 11 illustrated in FIG. 2 executing programs stored in one or more storage devices 13 using one or more RAMs 12.

The storage unit 16 stores information on the software update processing for one or more electronic control units mounted on the vehicle. As the information on the software update processing, the storage unit 16 stores at least update management information that associates information identifying software that can be used by the electronic control units 40a to 40d and update data for software of the electronic control units 40a to 40d for each piece of vehicle identification information (vehicle ID) that identifies a vehicle. As information identifying the software that can be used by the electronic control units 40a to 40d, for example, a combination of the latest version information of each software of the plurality of electronic control units 40a to 40d is defined.

Figure 4A:
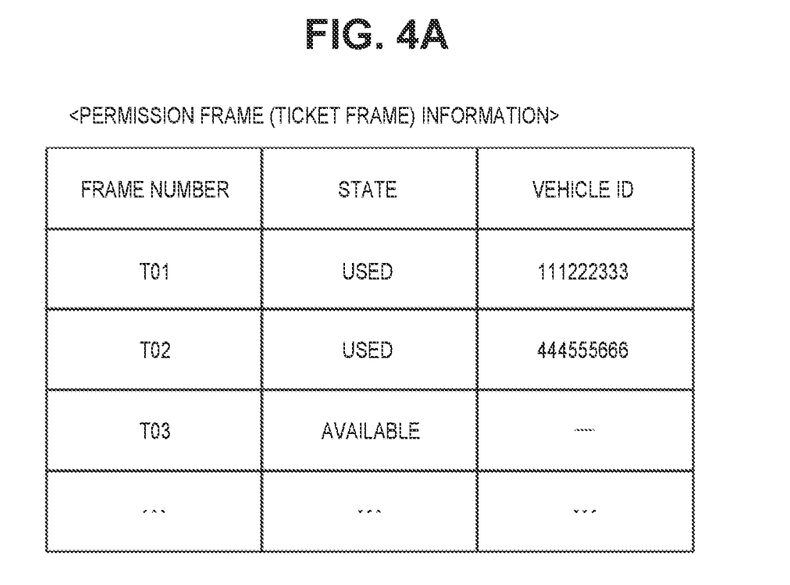
FIG. 4A is an example of permission frame information stored by the center.
Figure 4B:
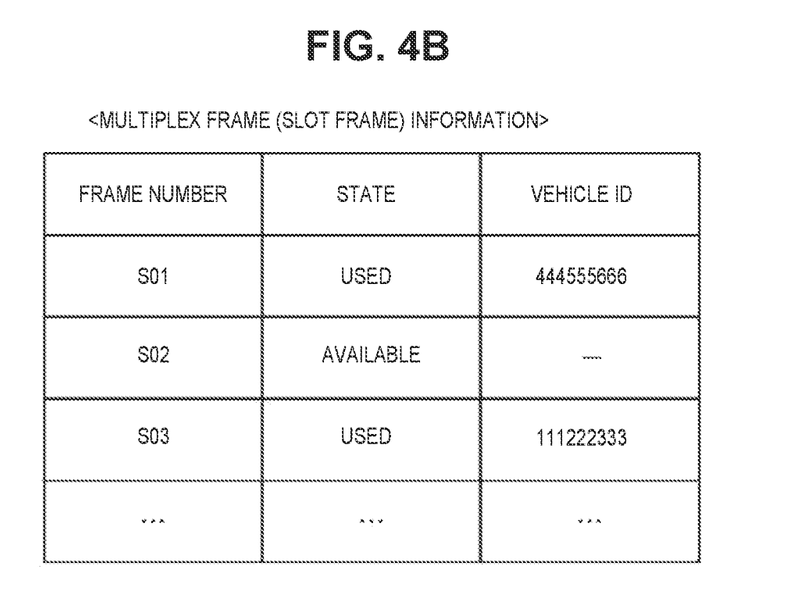
FIG. 4B is an example of multiplex frame information stored by the center.

In addition, as the information on the software update processing, the storage unit 16 stores information (used and available) on a state of each of permission frames (ticket frames) that define the number of permitted software update processes, and information (used and available) on a state of each of multiplex frames (slot frames) that define the number of permitted parallel transmissions of distribution packages. FIG. 4A illustrates an example of permission frames information stored by the storage unit 16, and FIG. 4B illustrates an example of multiplex frame information stored by the storage unit 16. In the permission frames information and multiplex frame information illustrated in FIGS. 4A and 4B, for each frame (T01, T02, T03, . . . , S01, S02, S03, . . . ), the usage status (used/available) and, if in use, the assigned vehicle information (vehicle ID, or the like) are stored. The number of permission frames and the number of multiplex frames can be arbitrarily set based on the number of vehicles subject to software update, the communication band that can be used for update, and the like.

In addition, as the information on the software update processing, the storage unit 16 can store an update status indicating the update state of the software being implemented in the vehicle. Further, the storage unit 16 can store information on the type of nonvolatile memory mounted on each of the plurality of electronic control units 40a to 40d.

The communication unit 17 transmits and receives data, information, requests, and the like to and from the OTA master 30. The communication unit 17 receives an update confirmation request for software from the OTA master 30. The update confirmation request is, for example, information transmitted from the OTA master 30 to the center 10 when the power or ignition is turned on (hereinafter referred to as "power ON") in the vehicle. In addition, the update confirmation request is information for requesting the center 10 to confirm whether there is update data for the electronic control units 40a to 40d based on vehicle configuration information. When the update confirmation request is received from the OTA master 30, the communication unit 17 transmits information indicating whether there is update data to the OTA master 30 based on an allocation state of each of the permission frames. In addition, the communication unit 17 receives a transmission request (download request) for a distribution package from the OTA master 30. When the download request for the distribution package is received, the communication unit 17 transmits to the OTA master 30 a distribution package including update data for software of the electronic control units 40a to 40d based on an allocation state of each of the multiplex frames.

When the communication unit 17 receives the update confirmation request from the OTA master 30, the determination unit 15 determines whether there is update data for software of the electronic control units 40a to 40d mounted on the vehicle identified by the vehicle ID included in the update confirmation request, based on update management information (such as a version of the electronic control unit) stored in the storage unit 16, and then when there is update data, the determination unit 15 determines whether at least one of the permission frames is available based on the permission frame information stored in the storage unit 16 (first determination). Then, the determination unit 15 transmits information indicating whether there is update data to the OTA master 30 through the communication unit 17 based on the result of the first determination. Further, when the communication unit 17 receives a transmission request for the distribution package from the OTA master 30, the determination unit 15 determines whether at least one of the multiplex frames is available based on the multiplex frame information stored in the storage unit 16 (second determination). Then, the determination unit 15 transmits the distribution package to the OTA master 30 through the communication unit 17 based on the result of the second determination.

When the determination unit 15 determines that there is update data for software of the electronic control units 40a to 40d and at least one of the permission frames is available, the control unit 18 newly allocates a permission frame to the OTA master 30 that has issued the update confirmation request and permits software update. On the other hand, when the determination unit 15 determines that there is update data for software of the electronic control units 40a to 40d but none of the permission frames is available, the control unit 18 notifies the OTA master 30 that has issued the update confirmation request that there is no update (first control). In addition, when the determination unit 15 determines that at least one of the multiplex frames is available, the control unit 18 newly allocates a multiplex frame to the OTA master 30 that has issued the transmission request of the distribution package, and generates and transmits the distribution package including the update data. On the other hand, when the determination unit 15 determines that none of the multiplex frames is available, the control unit 18 notifies the OTA master 30 that has issued the transmission request of the distribution package that the control unit 18 is waiting for the transmission of the distribution package (second control).

(2) In-Vehicle Network

The in-vehicle network 20 includes an OTA master 30, the electronic control units 40a to 40d, and a communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via the bus 60c.

The OTA master 30 can wirelessly communicate with the center 10 through the network 70 via the bus 60a and the communication module 50. The OTA master 30 is a device having a function of managing the OTA state, controlling an update sequence, which is the flow of software update processing, and updating the software of the electronic control unit (hereinafter referred to as a "target electronic control unit") to be updated. The OTA master 30 controls software update of the target electronic control unit of the electronic control units 40a to 40d based on the update data acquired from the center 10 and the like. The OTA master 30 may also be referred to as a central gateway (CGW).

Figure 5:
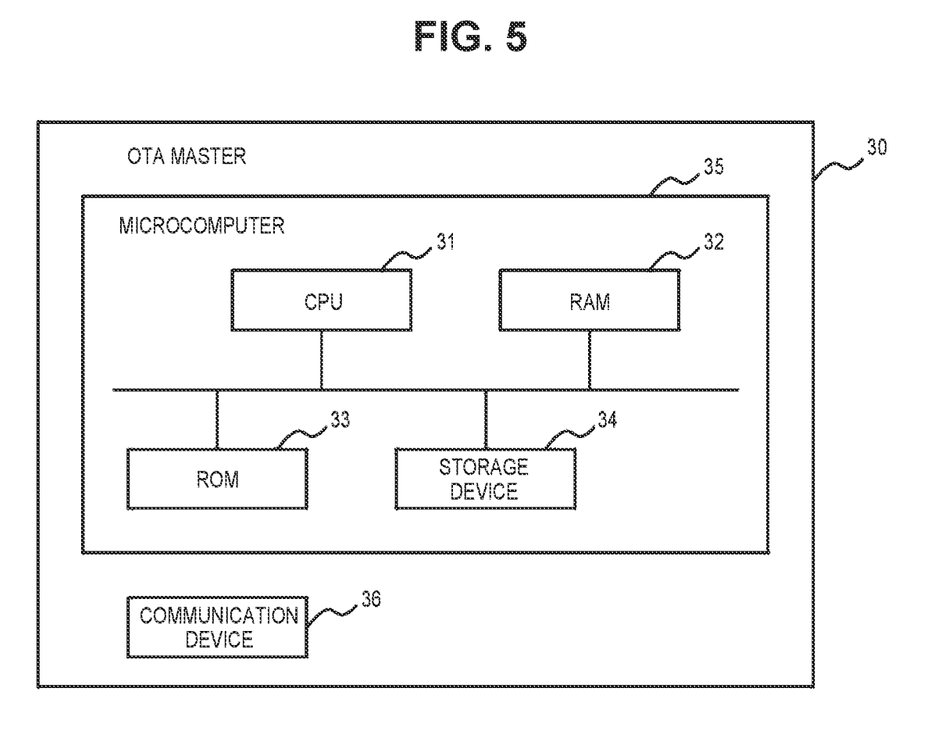
FIG. 5 is a block diagram illustrating a schematic configuration of an OTA master.

FIG. 5 is a block diagram illustrating a schematic configuration of the OTA master 30 in FIG. 1. As illustrated in FIG. 5, the OTA master 30 includes a CPU 31, a RAM 32, a read-only memory (ROM) 33, a storage device 34, and a communication device 36. The CPU 31, the RAM 32, the ROM 33, and the storage device 34 form a microcomputer 35. In the OTA master 30, the CPU 31 executes a program read from the ROM 33 using the RAM 32 as a work area, thereby executing predetermined processing related to software update. The communication device 36 is a device for communicating with the communication module 50 and each of the electronic control units 40a to 40d via the buses 60a to 60c illustrated in FIG. 1.

Figure 6:
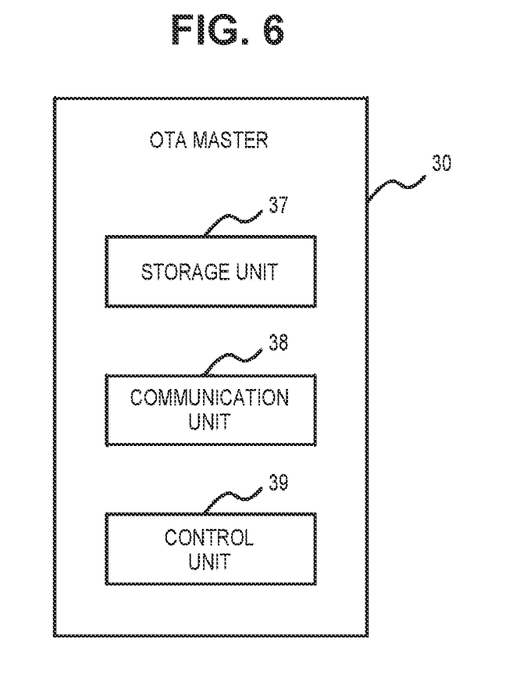
FIG. 6 is a functional block diagram of the OTA master.

FIG. 6 is a functional block diagram of the OTA master 30 illustrated in FIG. 5. The OTA master 30 illustrated in FIG. 6 includes a storage unit 37, a communication unit 38, and a control unit 39. The storage unit 37 is realized by the storage device 34 illustrated in FIG. 5. The communication unit 38 and the control unit 39 are realized by the CPU 31 illustrated in FIG. 5 executing a program stored in the ROM 33 using the RAM 32.

The storage unit 37 stores update data for software downloaded from the center 10, and the like, in addition to a program (program for controlling the OTA master 30) for executing software update of the electronic control units 40a to 40d and various data used when software update is executed. Further, the storage unit 37 can store information on the type of nonvolatile memory mounted on each of the electronic control units 40a to 40d.

The communication unit 38 transmits and receives data, information, requests, and the like to and from the center 10. The communication unit 38 transmits an update confirmation request for software to the center 10, for example, with the power ON of the vehicle as a trigger. The update confirmation request includes, for example, the vehicle ID for identifying the vehicle and version information regarding the current version of the software of the electronic control units 40a to 40d connected to the in-vehicle network 20. This update confirmation request may also include information on the types of electronic control units 40a to 40d connected to the in-vehicle network 20. The vehicle ID and the current version of the software of the electronic control units 40a to 40d are compared with the latest version of the software stored by the center 10 for each vehicle ID and used to determine whether there is update data for the software of the electronic control units 40a to 40d. In addition, the communication unit 38 receives a notification indicating the presence or absence of update data from the center 10 as a response to the update confirmation request. When there is update data for the software of the electronic control units 40a to 40d, the communication unit 38 transmits a download request for a distribution package of update data for software to the center 10 and receives (downloads) the distribution package transmitted from the center 10 under the control of the control unit 39. The communication unit 38 also transmits to the center 10 the update state of software transmitted by the electronic control units 40a to 40d.

Based on the response from the center 10 to the update confirmation request received by the communication unit 38, the control unit 39 determines whether there is update data for software of the electronic control units 40a to 40d. In addition, the control unit 39 decrypts the distribution package received (downloaded) from the center 10 by the communication unit 38 and stored in the storage unit 37 and verifies its authenticity based on its own control. Further, the control unit 39 uses update data received (downloaded) from the center 10 to control software update processing (various types of verifications, installation, activation, and the like) of the electronic control units 40a to 40d. Specifically, the control unit 39 transfers one or more pieces of update data downloaded in the distribution package to the target electronic control unit and causes the target electronic control unit to install update software based on the update data. After the installation is completed, the control unit 39 instructs the target electronic control unit to activate the installed update software. During the software update processing, the control unit 39 preferably controls procedures such as various types of verifications, installations, and activations in the electronic control units 40a to 40d.

The electronic control units 40a to 40d are devices (ECU: Electronic Control Unit) for controlling the operation of each part of the vehicle. Although FIG. 1 illustrates an example in which the in-vehicle network 20 includes four electronic control units 40a to 40d, the number of electronic control units is not particularly limited thereto. For example, a display device (HMI) may be connected to the OTA master 30 to perform various displays such as displaying that there is update data during update processing for software of the electronic control units 40a to 40d, displaying an approval request screen for requesting approval of software update from a user or administrator of the vehicle, and displaying the result of software update. A car navigation system or the like can be used as the display device. In addition, the number of buses connecting the electronic control unit to the OTA master 30 is not particularly limited. For example, the display device described above may be connected to the OTA master 30 on buses other than buses 60a to 60c.

The communication module 50 is a unit having a function of controlling communication between the center 10 and the vehicle, and is communication equipment for connecting the in-vehicle network 20 to the center 10. The communication module 50 is wirelessly connected to the center 10 via the network 70, and the OTA master 30 authenticates the vehicle and downloads update data. In addition, the communication module 50 may be provided in the OTA master 30.

Overview of Update Processing for Software

The OTA master 30 transmits an update confirmation request for software to the center 10, for example, with the power ON of the vehicle as a trigger. The update confirmation request includes at least a vehicle ID for identifying the vehicle and vehicle configuration information, which is information on a state (system configuration) of each of the electronic control units, such as the current versions of the hardware and software of the electronic control units 40a to 40d connected to the in-vehicle network 20. The vehicle configuration information can be created by acquiring an identification number (ECU_ID) of an electronic control unit from the electronic control units 40a to 40d connected to the in-vehicle network 20, and an identification number (ECU_Software_ID) of the software version of the electronic control unit. The vehicle ID and the current version of software of the electronic control unit 40a to 40d are compared with the latest version of the software stored by the center 10 for each vehicle ID and used to determine whether there is update data for the software of the electronic control units 40a to 40d. As a response to the update confirmation request received from the OTA master 30, the center 10 transmits to the OTA master 30 a notification indicating the presence or absence of update data based on the allocation state of each of the permission frames. The OTA master 30 to which the permission frame has been allocated transmits a download request for the distribution package to the center 10. The center 10 transmits the distribution package including update data to the OTA master 30 that received the download request based on the allocation state of each of the multiplex frames. In addition to the update data, the distribution package may include information identifying a method of encryption applied to the distribution package, verification data for verifying the authenticity of the update data, the number of update data, type information, and various control information used when updating software.

The OTA master 30 determines, based on the permission frame allocated by the center 10, whether there is update data for software of the electronic control units 40a to 40d. The OTA master 30 also decrypts the distribution package received from the center 10 and stored in the storage device 13 and verifies its authenticity. In addition, the OTA master 30 transfers one or more pieces of update data downloaded in the distribution package to the target electronic control unit and causes the target electronic control unit to install the update data. After the installation is completed, the OTA master 30 instructs the target electronic control unit to activate the installed updated software.

In addition, in approval request processing, the OTA master 30 causes an output device to output a notice that approval is required for the software update and a notice prompting the user to input information indicating that the software update has been approved. As the output device, a display device (not illustrated) that is provided in the in-vehicle network 20 and provides notification by display, an audio output device (not illustrated) that provides notification by sound, or the like can be used. For example, when the display device is used as the output device in the approval request processing, the OTA master 30 can cause the display device to display an approval request screen for asking the user or administrator to approve the software update, or cause the display device to display a notification prompting a specific input operation such as pressing an approval button when the user or administrator approves. In addition, in the approval request processing, the OTA master 30 can cause the display device to display text, icons, or the like notifying that there is update data for software of the electronic control units 40a to 40d, or cause the display device to display restrictions, and the like during execution of software update processing. When the OTA master 30 receives an approval input from the user or administrator, the OTA master 30 executes control processing for the above-described installation and activation to update the software of the target electronic control unit.

The software update processing comprises a phase (download phase) in which the OTA master 30 downloads update data from the center 10, a phase (installation phase) in which the OTA master 30 transfers the downloaded update data to the target electronic control unit and installs the update software based on the update data in a storage area of the target electronic control unit, and a phase (activation phase) for activating the update software installed by the target electronic control unit.

Downloading is processing in which the OTA master 30 receives update data for updating the software of the electronic control unit, which is transmitted from the center 10, and stores it in the storage unit 37. During downloading, update data is downloaded using a distribution package encrypted according to a predetermined security level. The download phase includes not only execution of download but also control of a series of processes related to download, such as determining whether installation is executable, decryption of a distribution package, verification of update data, and the like.

The update data transmitted from the center 10 to the OTA master 30 may include any of update software (whole data or difference data) for the electronic control unit, compressed data obtained by compressing the update software, and divided data obtained by dividing the update software or the compressed data. The update data may also include the ECU_ID (or serial number) of the target electronic control unit and the ECU_Software_ID of the target electronic control unit before update. The downloaded distribution package may include update data for only a single electronic control unit or update data for a plurality of electronic control units.

Installation is processing in which the OTA master 30 writes update software (updated program) to the non-volatile memories of the target electronic control units in a predetermined order based on the update data downloaded from the center 10. The installation phase includes not only execution of installation, but also control of a series of processes related to installation, such as determining whether installation is executable, transferring update data, and verifying update software.

When the update data includes the update software itself (all data), the OTA master 30 transfers the update data (update software) to the target electronic control unit in the installation phase. In addition, when the update data includes compressed data, difference data, or divided data of the update software, the OTA master 30 may transfer update data to the target electronic control unit, and the target electronic control unit may generate update software from the update data. Alternatively, in this case, after the OTA master 30 generates the update software from the update data, the update software may be transferred to the target electronic control unit. Here, update software can be generated by decompressing the compressed data or assembling (integrating) difference data or divided data.

Installation of update software can be performed by the target electronic control unit based on an installation request from the OTA master 30. A specific target electronic control unit that has received update data may perform installation autonomously without receiving an explicit instruction from the OTA master 30.

Activation is processing by which the target electronic control unit activates the update software installed in the non-volatile memory. The activation phase includes not only execution of activation, but also a series of controls related to activation, such as determining whether activation is executable, requesting approval from the user or administrator of the vehicle for activation, and verifying the execution result.

Activation of update software can be performed by the target electronic control unit based on an activation request from the OTA master 30. A specific target electronic control unit that has received update data may perform activation autonomously after completion of installation without receiving an explicit instruction from the OTA master 30.

The software update processing can be performed continuously or in parallel for the target electronic control units.

Further, the "software update processing" in this specification includes not only the processing of continuously performing all of downloading, installing, and activating, but also the processing of performing only part of downloading, installing, and activating.

Control

Next, with further reference to FIGS. 7A, 7B, and 8, the control executed in the network system according to the present embodiment will be described.

(1) Control by the Center

Figure 7A:
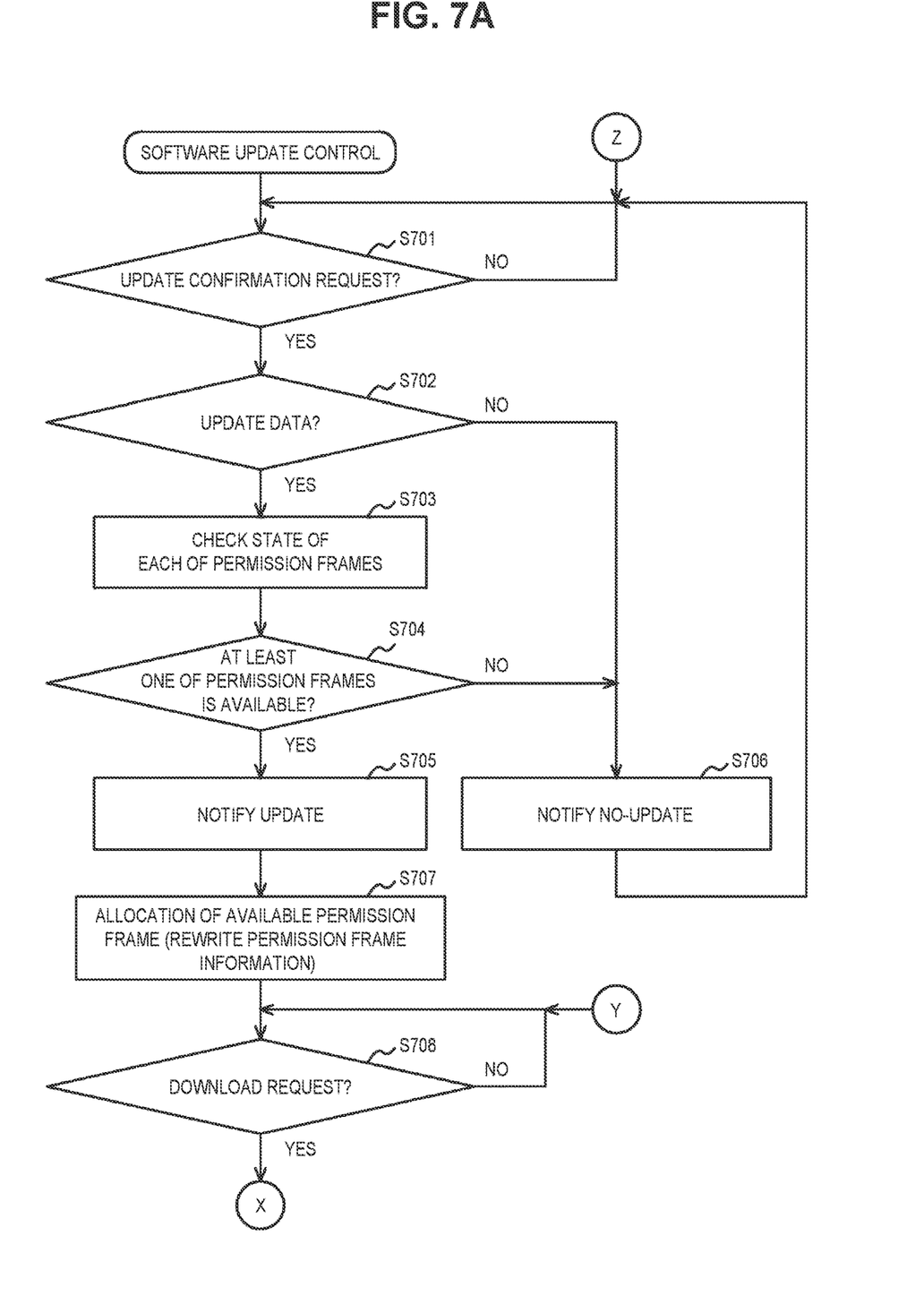
FIG. 7A is a processing flowchart of update control executed by the center.
Figure 7B:
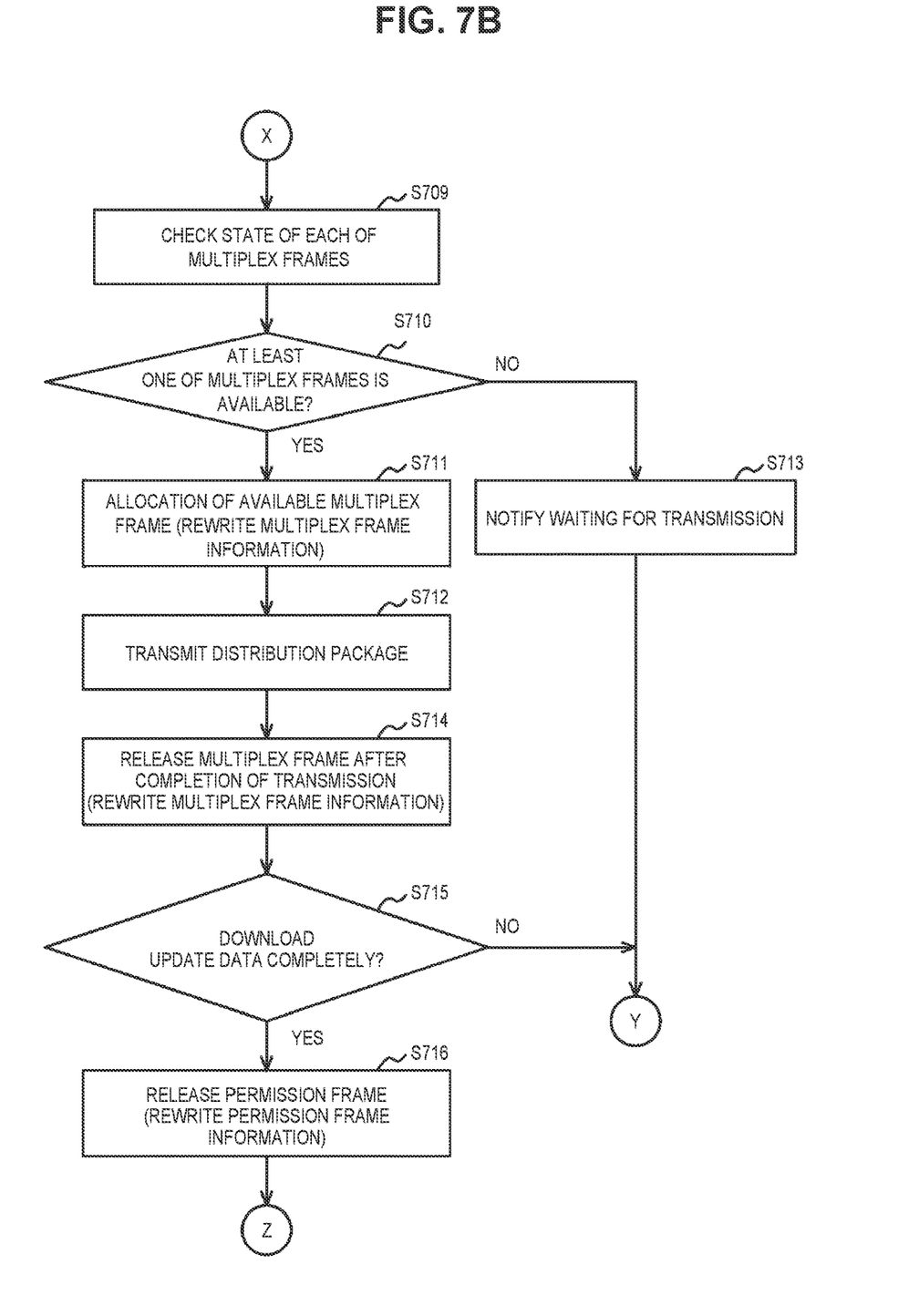
FIG. 7B is a processing flowchart of update control executed by the center.

FIGS. 7A and 7B are flowcharts for illustrating processing procedures of software update control executed by each component of the center 10. The processing in FIG. 7A and the processing in FIG. 7B are connected by connectors X, Y, and Z.

Step S701

The communication unit 17 determines whether there is an update confirmation request for software from the OTA master 30 as an inquiry for software update. When the communication unit 17 determines that there is an update confirmation request (Step S701, YES), the process proceeds to Step S702, whereas when it is determined that there is no update confirmation request (Step S701, NO), determination of the presence or absence of an update confirmation request is repeated.

Step S702

The determination unit 15 determines whether there is update data for software of the electronic control units 40a to 40d of the vehicle on which the OTA master 30 that has issued the update confirmation request is installed. The determination can be made based on the update management information (such as the version of the electronic control unit) stored in the storage unit 16 and the vehicle ID included in the update confirmation request. When the determination unit 15 determines that there is update data (Step S702, YES), the process proceeds to Step S703, whereas when it is determined that there is no update data (Step S702, NO), the process proceeds to Step S706.

Step S703

The determination unit 15 checks the state of each of the permission frames (ticket frames). The check is performed based on the permission frame information stored in the storage unit 16. After the determination unit 15 checks the state of each of the permission frames, the process proceeds to Step S704.

Step S704

The determination unit 15 determines whether at least one of the permission frames is available as a result of the state check. A state in which the permission frame is available is a state in which a permission frame is not allocated to any OTA master 30. When the determination unit 15 determines that at least one of the permission frames is available (Step S704, YES), the process proceeds to Step S705, whereas when it is determined that none of the permission frames is available (Step S704, NO), the process proceeds to Step S706.

Step S705

The control unit 18 notifies the OTA master 30, which has issued the update confirmation request for software in Step S701, that "there is an update". When the control unit 18 notifies that there is an update, the process proceeds to Step S707.

Step S706

The control unit 18 notifies the OTA master 30, which has issued the update confirmation request for software in Step S701, that "there is no update". In this processing, even when there actually is update data, when none of the permission frames is available, the OTA master 30 will be notified that there is no update. When the control unit 18 notifies the OTA master 30 that there is no update, the process proceeds to Step S701.

Step S707

The control unit 18 allocates a permission frame available among the permission frames to the OTA master 30 that has issued the update confirmation request for software. This rewrites the permission frame information stored in the storage unit 16. After the control unit 18 allocates the permission frame, the process proceeds to Step S708.

Step S708

The communication unit 17 determines whether there is a download request from the OTA master 30 to which the permission frame is allocated. The download requests determined here are requests from all OTA masters 30 to which permission frames have already been allocated, including the OTA masters 30 to which a permission frame has been newly allocated in Step S707. Generally, download requests are processed by the center 10 in the order received. When the communication unit 17 determines that there is a download request (Step S708, YES), the process proceeds to Step S709, whereas when it is determined that there is no download request (Step S701, NO), the determination of the presence or absence of a download request is repeated.

Step S709

The determination unit 15 checks the state of each of the multiplex frames (slot frames). The check is performed based on the multiplex frame information stored in the storage unit 16. After the determination unit 15 checks the state of each of the multiplex frames, the process proceeds to Step S710.

Step S710

The determination unit 15 determines whether at least one of the multiplex frames is available as a result of the state check. A state in which the multiplex frame is available is a state in which the multiplex frame is not used for transmission of the distribution package. When the determination unit 15 determines that at least one of the multiplex frames is available (Step S710, YES), the process proceeds to Step S711, whereas when it is determined that none of the multiplex frames is available (Step S710, NO), the process proceeds to Step S713.

Step S711

The control unit 18 allocates a multiplex frame available among the multiplex flames to transmit the distribution package to the OTA master 30 that has issued the download request. As a result, the multiplex frame information stored in the storage unit 16 is rewritten. The number of multiplex frames allocated to one download request may be one or more, depending on the availability, the progress status of download, and the like. After the control unit 18 allocates the multiplex frames, the process proceeds to Step S712.

Step S712

The control unit 18 transmits the distribution package via the communication unit 17 to the OTA master 30 to which the multiplex frame is allocated. The distribution package to be transmitted may include all of the update data, or may be divided into a plurality of pieces of data. When the distribution package is transmitted by the control unit 18, the process proceeds to Step S713.

Step S713

The control unit 18 notifies (transmission waiting notification) the OTA master 30 that has issued the download request that the control unit 18 is waiting for transmission of the distribution package because the distribution package cannot be immediately transmitted. The waiting time may be determined by the control unit 18 or by the OTA master 30 that receives the notification. When the OTA master 30 is notified of the transmission waiting by the control unit 18, the process proceeds to Step S708.

Step S714

After the transmission of the distribution package is completed, the control unit 18 releases the multiplex frame used for the transmission for other transmissions (canceling of allocation). As a result, the multiplex frame information stored in the storage unit 16 is rewritten. When the multiplex frame is released by the control unit 18, the process proceeds to Step S715.

Step S715

The control unit 18 determines whether there is an OTA master 30 that has completely downloaded the update data from among the OTA masters 30 to which the permission frame has been allocated. Completion of the download of all update data can be determined based on a download completion notification or the like transmitted from the OTA master 30. When the control unit 18 determines that there is an OTA master 30 that has completely downloaded the update data (Step S715, YES), the process proceeds to Step S716, whereas when it is determined that there is no OTA master 30 that has completely downloaded the update data (Step S715, NO), the process proceeds to Step S708.

Step S716

The control unit 18 releases the permission frame allocated to the OTA master 30 that has completely downloaded the update data for other OTA masters 30 (canceling of allocation). This rewrites the permission frame information stored in the storage unit 16. When the control unit 18 releases the permission frame allocated to the OTA master 30, the process proceeds to Step S701.

In the embodiment, the software update processing is described on the premise that there is approval from a vehicle user such as the user. However, if necessary, the approval of the vehicle user may be separately requested for each process. In this case, when the vehicle user does not approve, the allocated permission frame or multiplex frame may be released.

(2) Control by OTA Master

Figure 8:
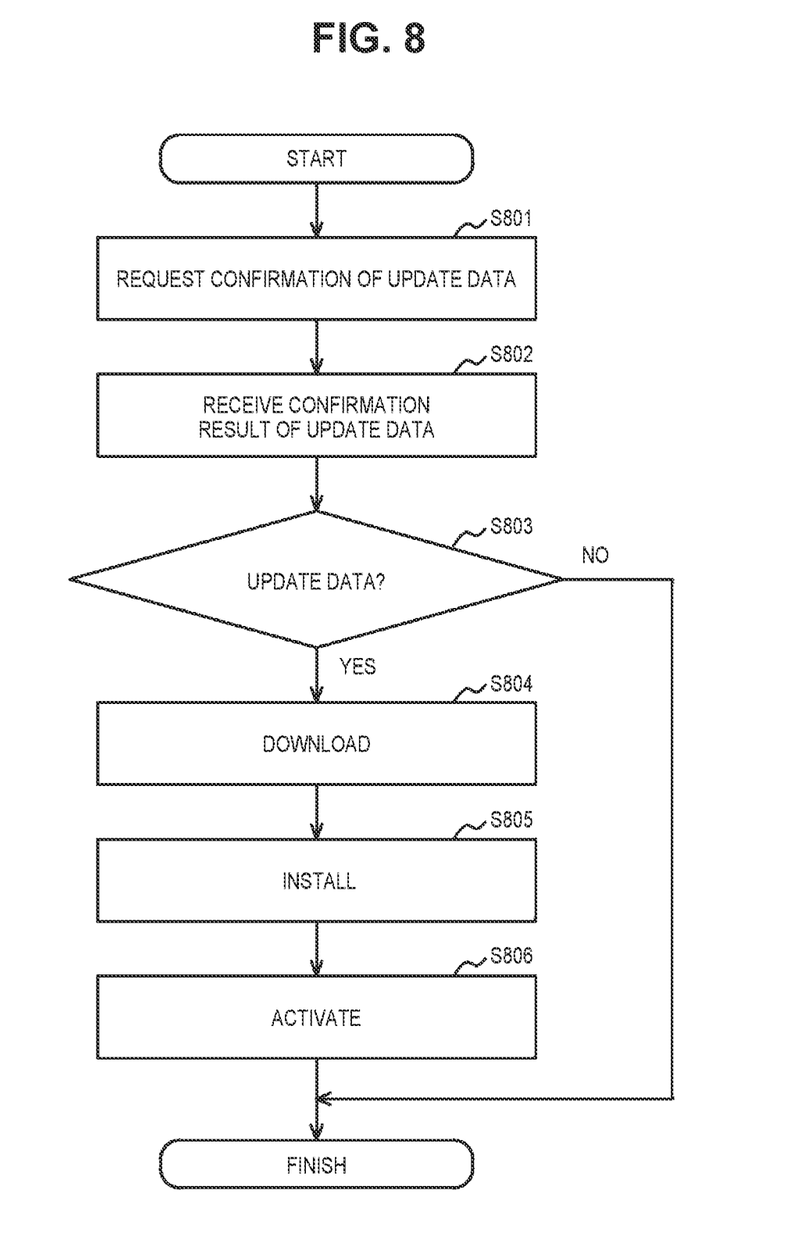
FIG. 8 is a flowchart of software update control processing executed by the OTA master.

FIG. 8 is a flowchart for illustrating a processing procedure of software update control executed by each component of the OTA master 30. The software update control illustrated in FIG. 8 is executed, for example, with the power ON of the vehicle as a trigger.

Step S801

The communication unit 38 transmits to the center 10 a confirmation request as to whether there is update data for software of the electronic control units 40a to 40d. This confirmation request includes the vehicle ID and the current version of the software of the electronic control units 40a to 40d. When the confirmation request is transmitted to the center 10 by the communication unit 38, the process proceeds to Step S802.

Step S802

The communication unit 38 receives a confirmation result (update, no update) in response to the update data confirmation request from the center 10. When the confirmation result is received by the communication unit 38, the process proceeds to Step S803.

Step S803

The control unit 39 determines whether there is update data for software of at least one of the electronic control units 40a to 40d based on the confirmation result received by the communication unit 38. When the control unit 39 determines that there is at least one piece of update data for software (Step S803, YES), the process proceeds to Step S804, whereas when it is determined that there is no update data for software (Step S803, NO), the software update control ends.

Step S804

The control unit 39 downloads update data. Specifically, the communication unit 38 transmits a download request for a distribution package including update data to the center 10, and the communication unit 38 receives the distribution package transmitted from the center 10 in response to the download request. The communication unit 38 stores the received distribution package in the storage unit 37 of the OTA master 30. When the update data is downloaded by the control unit 39, the process proceeds to Step S805.

Step S805

The control unit 39 executes software installation based on the update data for the target electronic control unit. Specifically, the control unit 39 transfers the update data included in the distribution package to the target electronic control unit and instructs that installation of the update software is performed. The target electronic control unit writes the update data received from the OTA master 30 into a data storage area. When the update software is installed by the control unit 39, the process proceeds to Step S806.

Step S806

The control unit 39 executes activation of the update software installed in the target electronic control unit. Specifically, the control unit 39 instructs the target electronic control unit that has written the update software to the data storage area to activate the update software. The target electronic control unit restarts when a specific input operation such as power OFF is performed, and executes the update software. When the control unit 39 executes activation processing for the update software, the software update control ends.

Effects

As described above, according to the network system according to an embodiment of the present disclosure, when the center receives an inquiry about the presence or absence of software update from an OTA master and update data for the electronic control unit for which software update is controlled by the OTA master exists, the center gives a permission for the update processing to the OTA master only when at least one of the permission frames is available (ticket frames). When none of the permission frames is available, even when there is update data, the update processing is postponed by notifying the OTA master that there is no update. By this processing, the vehicles for which software update is to be performed in parallel can be narrowed down, so it is possible to avoid many requests being duplicated at the same time.

In addition, according to the network system according to an embodiment of the present disclosure, when the center receives a transmission request for the distribution package from the OTA master of the vehicle that has permitted update processing by allocating a permission frame, the center transmits the distribution package within an allocatable range of a multiplex frame (slot frames). When none of the multiplex frames is available, the center waits to transmit the distribution package. With this processing, software update can be executed by transmitting the distribution package efficiently without putting pressure on the communication band having restrictions.

Although an embodiment of the technology of the present disclosure is described above, the present disclosure can be understood not only as a center, but also as a method and a program executed by a center including a processor and a memory, or a computer-readable non-temporary storage medium storing the program.

The technology of the present disclosure can be used in a network system for updating software of an electronic control unit.

What is claimed is:

1. A control method executed by a center that includes processing circuitry and a memory storing instructions executable by the processing circuitry and is configured to communicate with an Over-The-Air (OTA) master configured to control software update for an electronic control unit mounted on a vehicle, the control method comprising:

determining availability of a plurality of permission frames, each of which defines a permission for update processing for a respective OTA master, when an inquiry for software update is received from the OTA master and update data for the electronic control unit exists;

when at least one of the permission frames is available, allocating a permission frame available among the permission frames to the OTA master that transmits the inquiry and permitting update processing for the OTA master;

determining availability of multiplex frames, each of which defines a permission for parallel transmission of a distribution package associated with a respective OTA master, when a transmission request for the distribution package is received from the OTA master to which the permission frame is allocated;

when at least one of the multiplex frames is available, allocating a multiplex frame available among the multiplex frames to the OTA master to which the permission frame is allocated and controlling transmission of the distribution package based on the allocated multiplex frame; and updating a stored state of the permission frame and the multiplex frame in the memory according to allocation and release of the permission frame and the multiplex frame.

2. A center that is configured to communicate with an Over-The-Air (OTA) master configured to control software update for an electronic control unit mounted on a vehicle, the center comprising processing circuitry and a memory storing instructions executable by the processing circuitry, wherein the processing circuitry is configured to:

determine availability of a plurality of permission frames, each of which defines a permission for update processing for a respective OTA master, when an inquiry for software update is received from the OTA master and update data for the electronic control unit exists;

when at least one of the permission frames is available, allocate a permission frame available among the permission frames to the OTA master that transmits the inquiry and permit update processing for the OTA master;

determine availability of multiplex frames, each of which defines a permission for parallel transmission of a distribution package associated with a respective OTA master, when a transmission request for the distribution package is received from the OTA master to which the permission frame is allocated;

when at least one of the multiplex frames is available, allocate a multiplex frame available among the multiplex frames to the OTA master to which the permission frame is allocated and control transmission of the distribution package based on the allocated multiplex frame; and update a stored state of the permission frame and the multiplex frame in the memory according to allocation and release of the permission frame and the multiplex frame.

3. The center according to claim 2, wherein the processing circuitry is further configured to notify the OTA master that transmits the inquiry that no update is available when none of the permission frames is available.

4. The center according to claim 2, wherein the processing circuitry is further configured to notify the OTA master to which the permission frame is allocated to wait for transmission of the distribution package when none of the multiplex frames is available.

5. The center according to claim 2, wherein the processing circuitry is further configured to release the multiplex frame allocated to the OTA master when transmission of the distribution package is completed to the OTA master to which the multiplex frame is allocated.

6. The center according to claim 2, wherein the processing circuitry is further is configured to release the permission frame allocated to the OTA master when the software update is completed in the OTA master to which the permission frame is allocated.

7. The center according to claim 5, wherein the memory is configured to store a state of each of the permission frames and a state of each of the multiplex frames.

8. The center according to claim 7, wherein the processing circuitry is further configured to:

rewrite the state of each of the permission frames stored in the one or more memories according to allocation and release of each of the permission frames; and rewrite the state of each of the multiplex frames stored in the one or more memories according to allocation and release of each of the multiplex frames.

9. A non-transitory storage medium that stores a control program that is executable by a computer of a center that includes processing circuitry and a memory storing instructions executable by the processing circuitry and is configured to communicate with an Over-The-Air (OTA) master configured to control software update for an electronic control unit that is mounted on a vehicle and that causes the computer to:

determine availability of a plurality of permission frames, each of which defines a permission for update processing for a respective OTA master, when an inquiry for software update is received from the OTA master and update data for the electronic control unit exists;

when at least one of the permission frames is available, allocate a permission frame available among the permission frames to the OTA master that transmits the inquiry and permit update processing for the OTA master;

determine availability of multiplex frames, each of which defines a permission for parallel transmission of a distribution package associated with a respective OTA master, when a transmission request for the distribution package is received from the OTA master to which the permission frame is allocated;

when at least one of the multiplex frames is available, allocate a multiplex frame available among the multiplex frames to the OTA master to which the permission frame is allocated and control transmission of the distribution package based on the allocated multiplex frame;

update a stored state of the permission frame and the multiplex frame in the memory according to allocation and release of the permission frame and the multiplex frame.

\* \* \* \* \*